United States Patent [19]

Eguchi et al.

[11] Patent Number: 4,847,528
[45] Date of Patent: Jul. 11, 1989

[54] PLASTIC MOLDING ON PENETRATION METAL, PARTICULARLY ON MOTOR END PLATE

[75] Inventors: Hitoshi Eguchi, Kasakake; Tsutomu Akiyama, Ohta; Toshiyuki Kobayashi, Kiryu; Michio Okada, Azuma; Minoru Takahashi, Maebashi; Yukio Osawa, Kasakake, all of Japan

[73] Assignee: Mitsuba Electric Manufacturing Co., Ltd., Gunma, Japan

[21] Appl. No.: 151,834

[22] Filed: Feb. 2, 1988

[30] Foreign Application Priority Data

| Feb. 10, 1987 | [JP] | Japan | 62-30572 |
| Feb. 10, 1987 | [JP] | Japan | 62-30573 |
| Feb. 10, 1987 | [JP] | Japan | 62-30574 |

[51] Int. Cl.$^4$ .................. B32B 1/10; H01R 13/40; H02K 15/14
[52] U.S. Cl. .................. 310/239; 264/135; 264/272.2; 264/273; 310/43; 310/71; 310/89; 310/91; 425/385; 439/736
[58] Field of Search .............. 264/135, 252, 265, 273; 310/43, 87, 88, 89, 71, 239, 91; 425/383, 384, 385, 394; 428/461, 462, 465, 515; 439/736

[56] References Cited

U.S. PATENT DOCUMENTS

| 4,505,971 | 3/1985 | Martin, Jr. ........................ 428/462 |
| 4,603,023 | 7/1986 | Mack et al. ....................... 264/135 |
| 4,626,721 | 12/1986 | Ouchi ................................ 310/87 |
| 4,673,836 | 6/1987 | Akiyama et al. .................. 310/43 |
| 4,684,421 | 8/1987 | Tate ................................... 428/462 |
| 4,691,430 | 9/1987 | Wheeler ........................... 439/736 |

Primary Examiner—Patrick R. Salce
Assistant Examiner—D. L. Rebsch
Attorney, Agent, or Firm—Rodman & Rodman

[57] ABSTRACT

A composite unit including metal and resin wherein a metal member and a resin member are formed integrally. A seal film made of resin or rubber having high affinity to metal and characterized by flexibility is interposed between contact surfaces of the metal member and the resin member. The seal film is formed of a dispersion having as its main component a copolymer of alkyl methacrylate-alkyl acrylate. The metal member is formed of an Fe group material and the resin member is formed of polyamide resin. The seal film, after being coated on the outer surface of the metal member as a liquid material is embedded in the resin member by insert-molding resin. The metal member is formed to provide a bracket of a starter motor and the resin member to provide a brush holder. A seal member made of rubber is baked onto the contact surfaces between the bracket and the brush holder, and the seal member is embedded in the brush holder made of resin.

16 Claims, 12 Drawing Sheets

4,847,528

PLASTIC MOLDING ON PENETRATION METAL, PARTICULARLY ON MOTOR END PLATE

BACKGROUND OF THE INVENTION

1. Field of the Invention

This invention relates to a composite unit including metal and resin and a process of producing the same, and more particularly to improvements in sealing properties between the contact surfaces of a metal member and a resin structure, said sealing properties being concerned with an effective technique utilized, for example, in a composite unit including a metal bracket and a resin brush holder (hereinafter referred to as "a bracket unit") used in a revolving electric machine such as a starter motor, wherein the brush holder is resin-molded integrally on a portion of the bracket.

2. Related Art Statement

As a bracket unit used in a starter motor, there has been proposed one wherein a resin brush holder is formed integrally with a bracket of a thin plate shape (refer to Japanese Utility Model Laid-Open 61-58834 for example).

Now, the inventors of the present invention have clarified that, in the brush holder of the type described, when an Fe group material is used in the bracket and a polyamide resin is used in the brush holder, respectively, if environmental tests such as thermal shock tests are conducted, then, because of difference in the coefficients of thermal expansion of the bracket and the brush holder, a relative displacement occurs between contact surfaces thereof, with the result that air-tightness and liquid-tightness are lowered in a housing of the starter motor to which this bracket unit is attached.

SUMMARY OF THE INVENTION

One object of the present invention is to provide a technique capable of avoiding poor sealing property because of a relative displacement between the contact surfaces of a metal member and a resin structure.

Another object of the present invention is to provide a revolving electric machine in which poor sealing properties due to the relative displacement between the contact surfaces of the bracket and the brush holder can be avoided.

The composite unit, including the metal and the resin, features a seal made of flexible resin or rubber having a high affinity to metal and resin interposed between the contact surfaces of the metal member and the resin structure.

In the composite unit including the metal and the resin, the seal film can be bonded or adhere to both the metal member and the resin structure, so that a space therebetween can be blocked to form a sealed state.

Furthermore, when a relative displacement occurs between the contact surfaces of the metal member and the resin structure due to a difference in the coefficient of thermal expansion therebetween, the seal film, having the flexibility, can follow the displacement to be flexibly deformed, so that the aforesaid sealed state can be maintained.

The revolving electric machine according to the present invention features, in the bracket unit, a seal made of flexible or rubber having a high affinity to the metal and resin, interposed between the contact surfaces of the bracket and the brush holder.

In the revolving electric machine described above, the seal film can be bonded or adhere to both metal and resin, whereby the space formed therebetween is blocked, so that the sealed state can be formed.

Furthermore, when the relative displacement occurs between the contact surfaces of the bracket and the brush holder due to the difference in the coefficient of thermal expansion therebetween, the seal film, having flexibility, can follow the displacement to be flexibly deformed, so that the sealed state can be maintained.

Further, the revolving electric machine according to the present invention features that, in the bracket unit, the seal member made of rubber is baked onto the contact surfaces between the bracket and the brush holder, and the brush holder is resin-molded so as to insert-mold the seal member thereinto.

In the revolving machine described above, the seal member is formed so as to be baked onto the bracket and embedded in the brush holder when the bracket is insert molded into the brush holder, so that the sealed state can be formed by blocking the space between the bracket and the brush holder.

Furthermore, when a relative displacement occurs between the contact surfaces of the bracket and the brush holder due to the difference in the coefficient of thermal expansion therebetween, the seal film made of the rubber, having elasticity, can follow the displacement to be elastically deformed, so that the aforesaid sealed state can be maintained.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENTS

Figure 1:
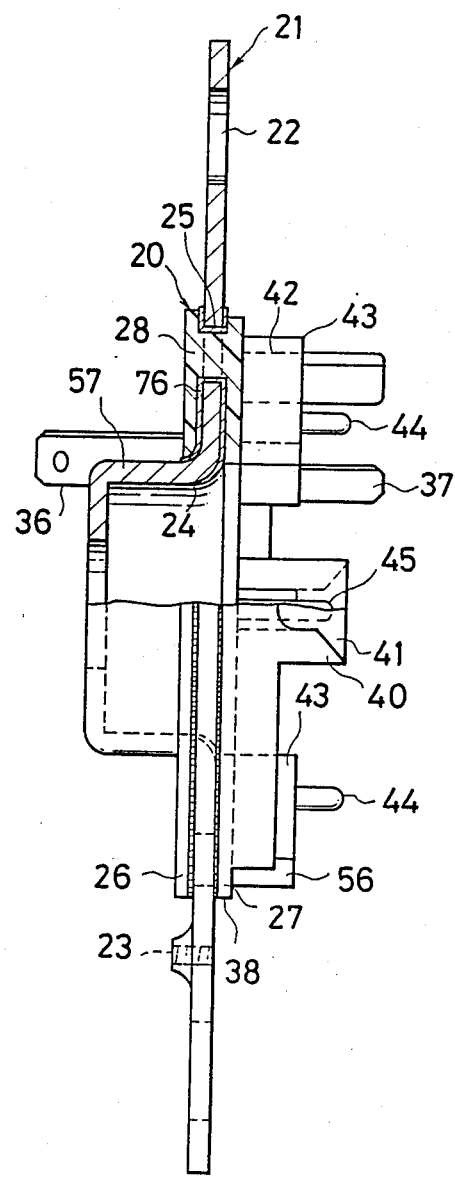
FIG. 1 is a partially cut-away enlarged side view showing one embodiment of the bracket unit according to the present invention.
Figure 2:
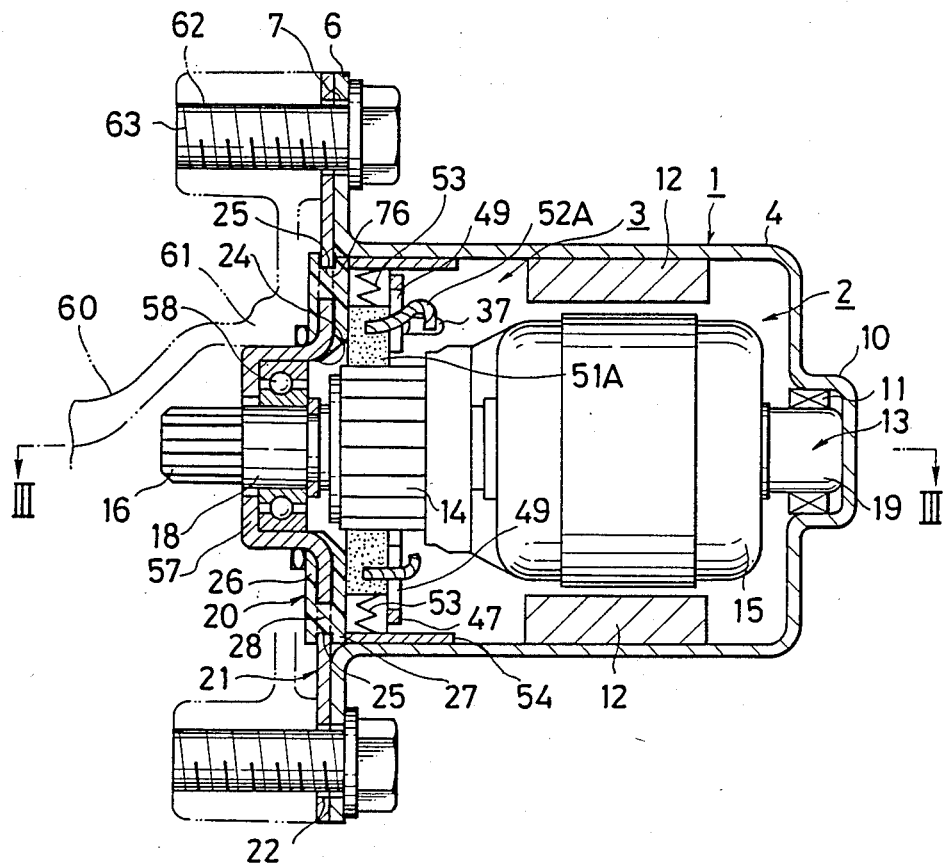
FIG. 2 is a longitudinal sectional view showing a starter motor, in which the above-described bracket unit is used.
Figure 3:
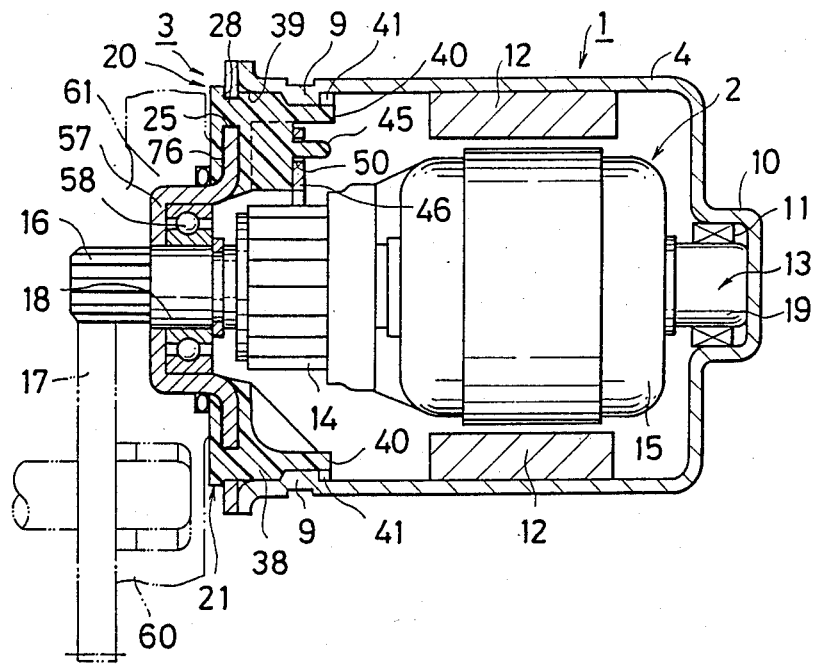
FIG. 3 is a sectional view taken along the line III—III in FIG. 2.

First, in the first embodiment shown in FIGS. 1 through 9, this motor is used in a starter motor, as an example of a revolving electric machine, and includes a stator 1, a rotor 2 and a bracket unit 3 as a composite unit including metal and resin according to the present invention.

The stator 1 includes a yoke 4 made of a magnetic material and integrally formed by a suitable method such as drawing press. The yoke 4 is a generally cylindrical shape, being open at one end face (hereinafter referred to as "the forward side") and blocked at the other end face (hereinafter referred to as "the rear side"). The yoke 4 is provided at the outer edge of the opening 5 thereof with a flange portion 6 protruding in the radial direction. The flange portion 6 is penetratingly provided with a pair of bolt insertion holes 7 and a pair of screw holes 8, which are arranged in the upper and lower portion thereof. The yoke 4 is formed at the inner edge of the opening 5 thereof with a pair of convex portions 9 for locking against rotation, protruding and being arranged opposingly. The yoke 4 is formed at a blocked surface wall in the rear surface thereof with a bearing member receiving portion 10 being of a cylindrical shape. This receiving portion 10 is coupled thereinto with a bearing member 11. Magnets 12 are fixed onto the inner peripheral surface of the yoke 4 circumferentially and equidistantly so as to form a magnetic field.

The rotor 2 has a shaft 13 longer than the length of the yoke 4. A commutator 14 and an armature 15 are fixed onto the outer periphery of the intermediate portion of the shaft 13 tandemly. A pinion 16 is on the forward end portion of the shaft 13. In its assembled state, the pinion 16 is in meshing engagement with a driven gear 17 of a starter. On the outer periphery of the shaft 13, journal portions 18 and 19 are formed at positions rearwardly of the pinion 16 and in the rear end portion. Both journal portions 18 and 19 are supported by a bearing member 58 to be described hereunder and the aforesaid bearing member 11 provided on the yoke 4, respectively, so that the shaft 13 can be rotatably journaled in the yoke 4.

Figure 4:
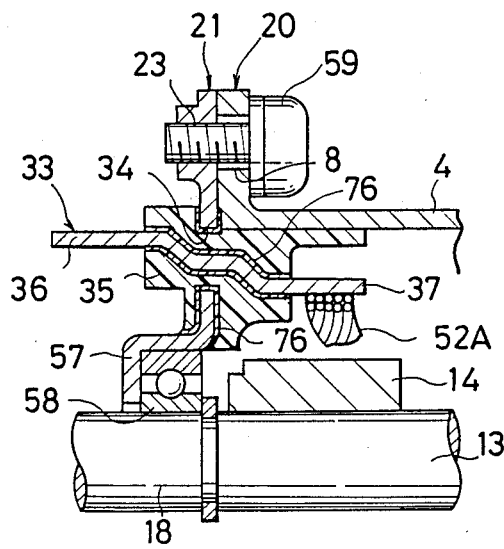
FIG. 4 is an enlarged, partially sectional view showing a terminal portion.

The bracket unit 3, as being a composite unit including metal and resin according to the present invention, has a brush holder 20 as a resin structure integrally formed into a generally disk shape by use of polyamide resin, and the brush holder 20 is integrally formed on a bracket 21 as a metal member. Furthermore, as shown in FIG. 4, a terminal member 33 is insert-molded in a given position of the brush holder 20 in a manner to penetrate through the bracket 21 in an insulated state.

A producing process and an arrangement of one embodiment of the bracket unit according to the present invention will hereunder be described.

Figure 5:
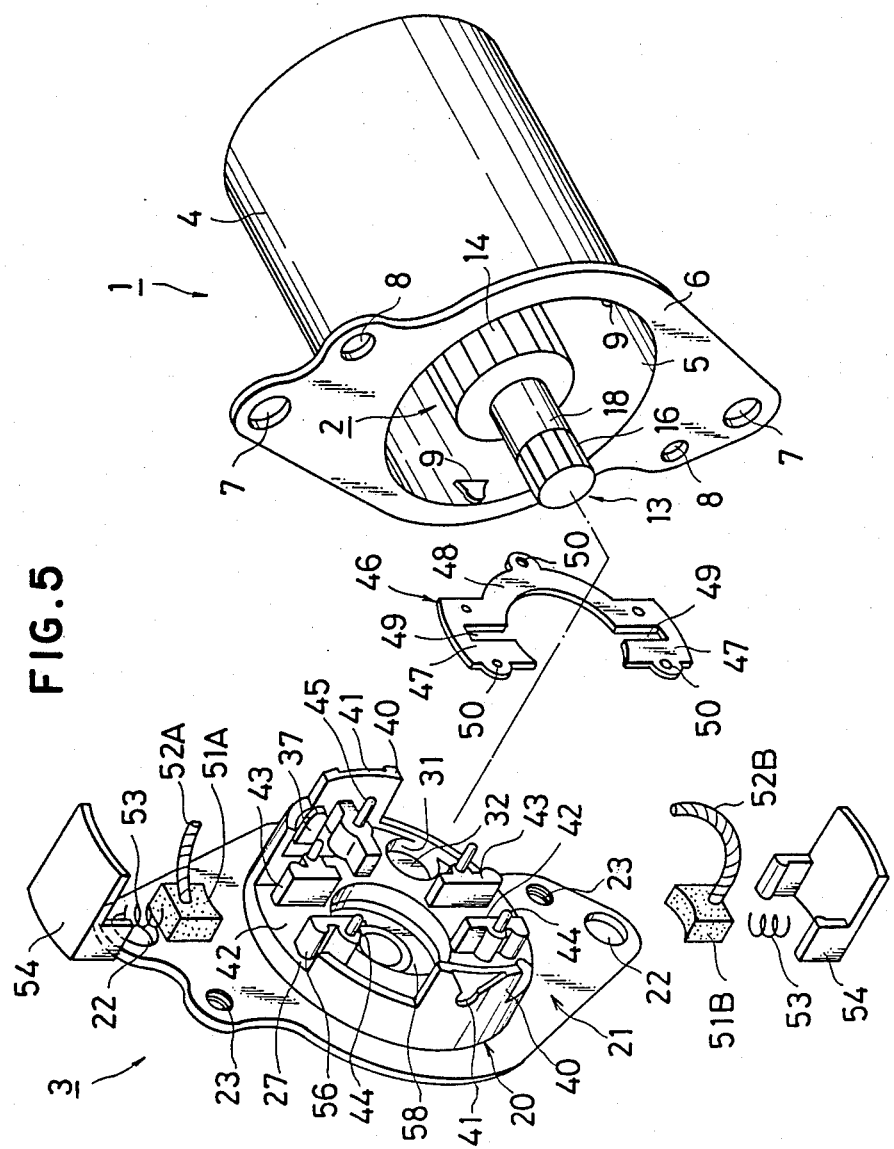
FIG. 5 is a disassembled perspective view of the starter motor.

To form the bracket 21, a plate material having electric conductivity, such as an iron plate, is formed into a flat plate shape as shown in FIG. 5 by blanking press in a manner to correspond to the outer shape of the flange portion 6 of the yoke 4. A pair of bolt insertion holes 22 and a pair of tapped holes 23 for threadably coupling a screw thereinto are arranged in the upper and lower portions of the bracket 21 and opened thereat. A window hole 24 is opened in the generally central portion of the bracket 21 in a manner to have an inner diameter slightly larger than the outer diameter of the commutator 14. Circumferentially arranged around the window hole 24 and opened are plurality of small holes 25. Connectingly to and integrally with the window hole 24, is provided a bearing member receiving portion 57 being of a round bowl shape. Furthermore, opened at a position of about 45 degrees in the upper left corner of the bracket 21 is an insertion hole 34 larger than the width and thickness of the terminal member 33.

Figure 6:
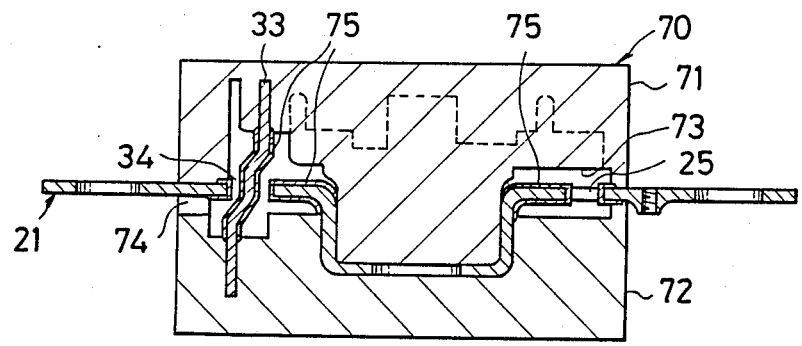
FIG. 6 is a longitudinal sectional view showing a partial manufacture thereof.

To form the brush holder 20 on the bracket 21, the bracket 21 is set in a manner to be clamped in a molding tool 70 as shown in FIG. 6. Although detailed description is omitted herein, the molding tool 70 has a top mold 71 and a bottom mold 72, and, at a mating surface of the molding tool, a cavity 73 opened with a gate 74 is recessed in a manner to be able to form the brush holder 20 having an arrangement to be described hereunder. A portion of the bracket 21, onto which the brush holder 20 is to be formed, is inserted into the cavity 73 and clamped between the top mold 71 and the bottom mold 72.

At the same time, the terminal member 33 is inserted through the insertion hole 34 of the bracket 21 in a manner so as not to touch the insertion hole, penetrates through the cavity 73, and is positioned and held by the top and bottom molds 71 and 72.

Here, before the bracket 21 is set into the molding tool 70, a dispersion having as its main component a copolymer of alkyl methacrylate-alkyl acrylate is uniformly coated on the outer surface of the portion of the bracket 21, onto which the brush holder 20 is to be formed, by a suitable thickness and with a suitable means such as a brush or a sprayer, so that a coating film 75 thereof can be formed. Furthermore, this coating film 75 is similarly formed on the outer surface of a portion of the terminal member 33, which is to be insert-molded as being another metal member inserted into the cavity 73 to be resin-molded.

The dispersion having its main component the copolymer of alkyl methacrylate-alkyl acrylate is an example of a liquid material of the resin or rubber having a high affinity to the metal and resin, and dispersions or latexes of the resin or rubber, which are listed hereunder and may be used as well.

Since the embodiment which incorporates the starter motor is used in very cold temperatures, the glass transition point of the copolymer of alkyl methacrylate-alkyl acrylate, that is used to a temperature less than about $-30°$ C. Furthermore, the resin used is capable of bearing the molding temperature of resin (about 280° C.). The thickness of the coating film 75 is determined depending on the types of resin or rubber used, types of liquid media, emulsifying agents and the like of the dispersions or latexes, the concentration and viscosity of the liquid material and so on; 1–50 μm is preferable and about 10 μm is more preferable. More specifically, when the thickness is less than 1 μm, the flexibility is difficult to see, and, when the thickness is 50 μm, the increasing rate of effect is decreased, whereby the cost is increased relative to the quantity used.

This coating film 75 is naturally or forcibly dried, so that water as the liquid medium of the dispersion is evaporated. Then, this coating film 75 is brought into a state of having the rubber elasticity characteristic and the flexibility, and is bonded or adheres to the outer surface of the metal. After the coating film 75 is dried, the bracket 21 and the terminal member 33, which are the metallic members, are set in the molding tool 70 as described above.

Thus, when the bracket 21 and the terminal member 33 are suitably set in the molding tool 70, the cavity 73 thereof is filled up with polyamide resin as being a molding material in a state of being heated and molten at a temperature of about 280° C. through the gate 74, the brush holder 20, as being the resin structure made of polyamide resin, is integrally molded onto the bracket 21, and the terminal member 33 is insert-molded in the brush holder 20. A portion of resin of the brush holder 20 is molded through holes 25 of the bracket 21, whereby the brush holder 20 is integrally formed with the bracket.

More specifically, at the time of molding the brush holder 20, the bracket 21 is positioned generally perpendicularly to the axis of the brush holder 20 and insert-molded, whereby the bracket 21 is integrally formed on the brush holder 20 in a state where a portion of the bracket 21 from the inner edge of the window hole 24 to the outer side of the small holes 25 is clamped between a front wall portion 26 and a rear wall portion 27 of the brush holder 20. In this state, portions of polyamide resin forming the brush holder 20 fill up the small holes 25 of the bracket 21 to thereby form solid columnar portions 28, respectively, whereby the bracket 21 and the brush holder 20 are integrated by these columnar portions 28 in a state of being completely locked against rotation. Furthermore, when the brush holder 20 is resin-molded, the terminal member 33 is fixedly held by a holding portion 35 of being a generally rectangular parallelepiped shape formed such that the insertion hole 34 is filled up with the resin.

Then, between the contact surfaces of the bracket 21 and the brush holder 20, i.e. between the front and rear surfaces of the bracket 21 and the front and rear wall portions 26 and 27 of the brush holder 20 and between the inner peripheries of the small holes 25 and the outer peripheries of the columnar portions 28, there is interposed a seal film 76 having flexibility and formed of the coating film 75 having as its main component the copolymer of alkyl methacrylate-alkyl acrylate. Since the copolymer of alkyl methacrylate-alkyl acrylate has high affinity to the metal and resin, this seal film 76 is firmly adheres or is bonded to the outer surfaces of the brush holder 20 and the bracket 21, or is physically or chemically connected thereto, so that the bracket 21 and the brush holder 20 can be integrated. Furthermore, between the contact surfaces of the brush holder 20 and the terminal member 33 inserted therethrough, there is interposed the seal film 76 similarly.

Opened at the position of about 45 degrees in the upper left corner of the brush holder 20 is a hole portion in a manner to expose the surface of the bracket 21. Opened at a position in the rear wall portion 27 of the brush holder 20, which corresponds to the front hole portion, is a rear hole portion 31 in a manner similar to the above. A surface portion of the bracket 21 at the bottom of this rear surface hole portion 31 forms a pigtail connecting portion 32. A lead wire connecting section 36 is formed by a portion forwardly protruding from the holding portion 35 of the terminal member 33, and a second pigtail connecting portion 37 is formed by a portion rearwardly protruding therefrom, respectively.

The outer diameter of the brush holder 20 at the rear wall portion 27 is substantially equal to the inner diameter of the yoke 4 at the opening 5 thereof and the axes of both members are aligned, whereby the outer periphery of the rear wall portion 27 and the inner periphery of the opening 5 of the yoke 4 substantially form an external faucet joint portion 38 and an internal faucet joint portion 39, respectively. Erected at the right and left positions in the outer edge of the rear surface of the rear wall portion 27 are a pair of erected walls 40 disposed generally in parallel to the axis. Formed in the outward surfaces of both erected walls 40 are recesses 41 for locking against rotating, which has the shape of a circle intersecting to the vertex of an inverted triangle. In a state where the external and internal faucet joint portions 38 and 39 are connected to each other, the convex portions 9 for locking against rotating, which are protruded at the inner edge of the opening 5 of the yoke 4, are coupled respectively into both recesses 41 for locking against rotating.

A pair of brush receiving chambers 42 opposed to each other are provided at the top and bottom positions on the rear surface of the rear wall portion 27. Each of the brush receiving chambers 42 is formed into a hollow and generally rectangular parallelepiped shape, in which a pair of guide walls 43 are erected and opposed to each other, with opposite end faces in the radial direction and the rear portion of the brush receiving chamber being open. Pins 44 for forming clinching portions 44A are projected from the rear surfaces of the guide walls 43, and a pin 45 for positioning a fall-off preventing plate 46 to be described hereunder is projected from a position between the brush receiving chamber 42 by the side of the erected walls 40 thereof. The openings at the rear portions of the brush receiving chambers 42 are blocked by the fall-off preventing plates 46 fixed by the pins in a state of being abutted against the rear surfaces of the guide walls 43.

In both brush receiving chambers 42, a pair of brushes 51A and 51B are inwardly directed and inserted in a manner to be slidable in the radial direction. Pigtails 52A and 52B set in both brushes 51A and 52B are slidably inserted through insertion holes 49 opened in the upper and lower portions of the fall-off preventing plate 46. An end of pigtail 52A of brush 51A provided at the upper portion is welded to the pigtail connecting portion 37 of the terminal member 33 and an end of the pigtail 52B of the brush 51B provided at the lower portion is welded to the pigtail connecting portion 32 of the bracket 21, whereby both ends are electrically connected to the terminal member 33 and the bracket 21, respectively.

At the outer sides of the brushes 51A and 51B, a pair of springs 53 are inserted through the outwardly directed openings of the brush receiving chambers 42 and received therein. The spring 53, taking a reaction force from a cap 54 fastened to the outwardly directed opening of the brush receiving chamber 42, biases the brush inwardly, to thereby urge the brush against the commutator of the rotator 2.

Formed at a position of the bracket 21, which corresponds to the window hole 24, is the generally cylindrical bearing member receiving portion 57 protruding forwardly. A bearing member 58 such as a ball bearing is coupled into this receiving portion 57 with the axes being accurately aligned. The axis of this receiving portion 57 is determined to be aligned with the axis of the external faucet joint portion 38 formed by the outer periphery of the rear wall portion 27 of the brush holder 20. Accordingly, the axis of the bearing member 58 aligned with the receiving portion 57 and received therein is aligned with the axis of the external faucet joint portion 38.

In a state where the bracket unit 3 thus constructed is assembled to the stator 1 and the rotor 2, the brush holder 20 is faucet-jointed to the opening 5 of the yoke 4 through the external and internal faucet joint portions 38 and 39, which are provided on the outer peripheral surface and the inner peripheral surface of the brush holder and the opening of the yoke, and the brush holder and the yoke are aligned with each other. In this state, the bearing member 58 being aligned with the external faucet joint portion 38 of the brush holder 20, the bearing member 58 is aligned with the axis of the yoke 4 as well. Accordingly, the shaft 13 of the rotor 2, the journal portions 18 and 19 of which are supported by this bearing member 58 and the bearing member 11 provided at the rear end portion of the yoke 4 is accurately aligned with the stator 1 and rotatably supported thereon.

To faucet joint the opening 5 of the yoke 4 to the brush holder 20, the convex portions 9 and the recesses 41 are matched with each other and coupled to each other. When the convex portions 9 are coupled into the recesses 41, the bolt insertion holes 7 and the screw insertion holes 8 in the flange portion 6 of the yoke 4, and the bolt insertion holes 22 and the tapped holes 23 for threadably coupling a screw thereinto, both of which are formed in the bracket 21, are matched with each other, respectively. When a screw 59 is inserted through the insertion hole 8 of the flange portion 6 of the yoke 4 and threadably coupled into the tapped hole 23, the bracket 21 is connected to the yoke 4, so that the stator 1, the rotator 2 and the bracket unit 3 can be connected to one another and integrated at once in a state where the axes and positions are coincided. Although detailed description will be omitted, in this state where the three members are integrated, the bearing member receiving portion 57 is coupled to a boss portion 61 of an engine case 60. When it is set that the axes of the boss portion 61 of the engine case 60 and the bearing member receiving portion 57 are aligned with each other, the shaft 13 supported by the bearing member 58 of bearing member receiving portion 57 is aligned with the boss portion 61. Because of this, the pinion 16 provided on the shaft 13 is in mesh with the driven gear 17 accurately.

Action of this embodiment will hereunder be described.

Since a starter motor is connectingly provided on the engine case as described above, a starter motor is expected to be exposed to the temperature environment from an intense cold atmospheric temperature to an engine overheat temperature. Then, with a starter motor, environmental tests including scores of thermal shock tests within the range from about $-20°$ C. to $150°$ C. are performed.

Figure 7:
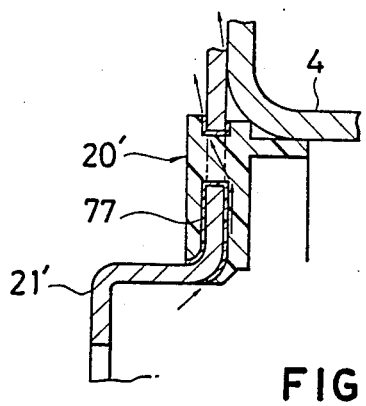
FIGS. 7 and 8 are enlarged, partially sectional views explaining the action.

Now, it has been clarified by the inventors of the present invention that, when the bracket unit, in which no seal film is interposed between the contact surfaces of the bracket and the brush holder, is used in the starter motor, if the thermal shock tests are conducted, then, a relative displacement 77 occurs between the contact surfaces of a bracket 21' and a brush holder 20' due to the difference in the coefficients of thermal expansion between the metal and resin as shown in FIG. 7, whereby in the air-tightness tests conducted thereafter, it is found that the air-tightness of a motor housing is lowered. It can be judged that this is because a very small space or spaces 77 occur due to a relative displacement between the contact surfaces of the bracket 21' and the brush holder 20', and the space or spaces lead to form uncontrollable and unexpected air passageways as indicated by arrow marks in FIG. 7. When such a relative displacement occurs between the contact surfaces of the bracket and the brush holder, rain water, condensed water and the like intrude into the motor housing from outside between the contact surfaces, thus causing lowered performance of the motor.

However, in this embodiment, the seal film 76 is interposed between the contact surfaces of the bracket 21 and the brush holder 20, so that, even after the thermal shock tests are conducted, air-tightness of the motor housing is maintained as expected. Accordingly, rain water, condensed water and the like can be prevented from intruding into the motor housing between the contact surfaces of the bracket 21 and the brush holder 20 from outside.

Figure 8:
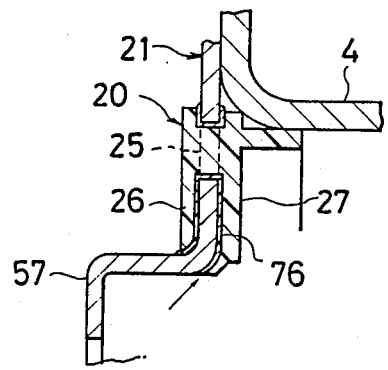

More specifically, during the thermal shock tests, even if the relative displacement occurs between the contact surfaces of the bracket 21 and the brush holder 20 due to the difference in the coefficients of thermal expansion between the metal and the resin, the seal film 76, having the high affinity to both the metal and the resin, is bonded or adheres to both the bracket 21 and the brush holder 20 as shown in FIG. 8. Moreover, the seal film 76 has the high flexibility, whereby the seal film 76 is flexibly deformed to allow the relative displacement between the bracket 21 and the brush holder 20 due to the difference in the coefficient of thermal expansion therebetween, maintaining unity of the seal film itself. Accordingly, even if the relative displacement occurs between the contact surfaces of the bracket 21 and the brush holder 20, the seal film 76 prevents the space and/or air passageways from being formed between the bracket 21 and the brush holder 20, so that the motor housing can maintain the expected air-tightness even after the thermal shock tests.

Table 1 inserted in the end of this specification shows the results of experiments on this air-tightness. The experiments were conducted as shown below.

First, experimental samples each formed by assembling a bracket unit to a yoke are repeatedly subject to cooling or heating from $-20°$ C. to $150°$ C. alternately more than ten times at intervals of about two hours.

Figure 9:
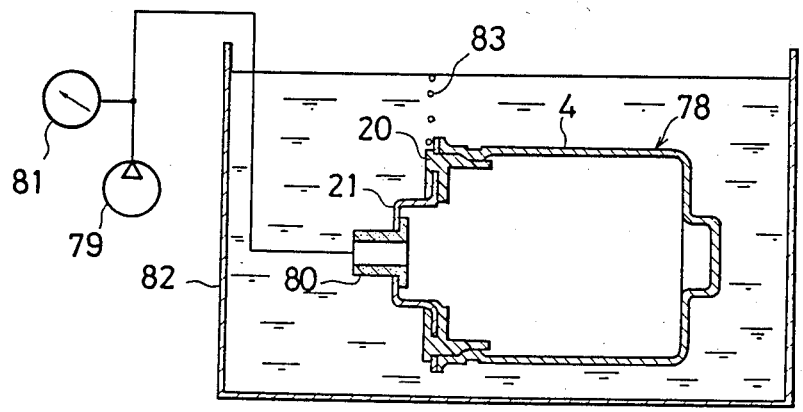
FIG. 9 is a typified diagram which explains an experimental method.

As shown in FIG. 9, an experimental sample 78 which has undergone the thermal shock tests is set such that a compressor 79 is fluidically connected to an airtight chamber formed by the bracket unit and the yoke in the experimental sample through a hose 80 or the like and a pressure gauge 81 is secured thereto in a manner to be able to measure the internal pressure of the airtight chamber.

In this set state, the experimental sample 78 is immersed in water of a water tank 82, and air is delivered under pressure into the airtight chamber by the compressor 79. Then, the pressure gauge 81 measures a value of internal pressure of the airtight chamber when a bubble 83 is generated between the contact surfaces of the bracket 21 and the brush holder 20 in the bracket unit. The values thus measured are the values of pressure shown in Table 1, with the unit being kg/cm². In passing, as for the phenomenon of water intrusion between the contact surfaces of the bracket and the brush holder, the experimental sample can bear the practical use if the value of experiment is only more than 0.3 kg/cm².

In Table 1, 1st sample shows a case where the bracket unit, in which no seal film is interposed between the bracket and the brush holder, is used, and 2nd sample and so forth show cases where the seal films using liquid materials of resin or rubber as listed in Table 2, respectively, are used to coat the experimental samples as shown below. More specifically, the liquid material is coated on the outer surface of the bracket three times by use of a brush to become the thickness of about 10–20 μm, the sample is left to stand for several hours for coating film to be formed, and thereafter, the brush holder 20 is formed such that the coating film is enveloped by polyamide resin, whereby the seal film 76 is interposed between the bracket 21 and the brush holder 20.

Incidentally, in the above embodiment, there have been described the composite unit including the bracket formed of the iron plate and the brush holder made of polyamide resin and the composite unit including the terminal member formed of a copper plate and the brush holder made of polyamide resin, however, the present invention need not necessarily be limited to this, and is applicable to composite units as a whole, in which the resin structure is integrally formed on the metal member. Particularly, outstanding advantages can be achieved when the present invention is applied to products requiring the air-tightness or liquid-tightness.

In the above embodiment, the seal film formed of the resin or rubber, which has high affinity to the metal and resin and flexibility, is interposed between the contact surfaces of the metal member and the resin structure, so that, even if relative displacement occurs between the contact surfaces of the metal member and the resin structure, the sealed state can be maintained.

TABLE 1

| SAMPLES | VALUE OF PRESSURE kg/cm² | SAMPLES | VALUE OF PRESSURE kg/cm² |
| --- | --- | --- | --- |
| 1st SAMPLE | 0.1 | 7th SAMPLE | 0.3 |
| 2nd SAMPLE | 2.0 | 8th SAMPLE | 1.0 |
| 3rd SAMPLE | 0.4 | 9th SAMPLE | 3.0 |
| 4th SAMPLE | 0.3 | 10th SAMPLE | MORE THAN 5.0 |
| 5th SAMPLE | 0.5 | 11th SAMPLE | MORE THAN 5.0 |
| 6th SAMPLE | 0.5 | | |

TABLE 2

| SAMPLES | SEAL FILM MATERIALS | DISPERSION (LATEX) PHYSICAL PROPERTIES | | | | | |
| --- | --- | --- | --- | --- | --- | --- | --- |
| | | SOLIDS CONTENTS (about %) | pH VALUE | MEAN PARTICLE DIAMETER (um) | VISCOSITY (CPS) | LOWEST FILM FORMATION TEMPERATURE (°C.) | CROSS-LINKABILITY |
| 2nd SAMPLE | ACRYL GROUP DISPERSION | 48 | 4.5~6.5 | 0.1 | 50~1000 | 15 | |
| 3rd SAMPLE | ACRYL GROUP DISPERSION | 48 | 7.5~9.5 | <0.1 | 5000~15000 | 24 | ONE LIQUID TYPE, ROOM TEMPERATURE |
| 4th SAMPLE | ACRYL GROUP DISPERSION | 48 | 7.5~9.5 | 0.1 | 200~3000 | <0 | ONE LIQUID TYPE, ROOM TEMPERATURE |
| 5th SAMPLE | ACRYL GROUP DISPERSION | 55.5 | 7~9.5 | 0.15 | 3000~15000 | <0 | ONE LIQUID TYPE, ROOM TEMPERATURE |
| 6th SAMPLE | ACRYLONITRILE-BUTADIENE GROUP LATEX | 40 | 8.0 | 0.12 | 12 | ROOM TEMPERATURE | |
| 7th SAMPLE | STYLRENE-BUTADIENE GROUP LATEX | 49 | 6.0 | 0.15 | 110 | ROOM TEMPERATURE | |
| 8th SAMPLE | AQUEOUS THERMOPLASTIC POLYESTER GROUP DISPERSION | 30 | 4~6 | | 0.6~10 | ROOM TEMPERATURE | |

| SAMPLES | SEAL FILM MATERIALS | FILM PHYSICAL PROPERTIES | | | | |
| --- | --- | --- | --- | --- | --- | --- |
| | | MEASURED VALUE OF 0.5 mm FILM | | | | |
| | | TENSILE STRENGTH (kg/cm²) | TENSILE ELONGATION (%) | WATER ABSORBING RATE (%) | SURFACE ADHESION | GLASS TRANSITION POINT (%) |
| 2nd SAMPLE | ACRYL GROUP DISPERSION | 35 | 500 | 11 | | −28 |
| 3rd SAMPLE | ACRYL GROUP DISPERSION | 65 | 450 | 5 | | 30 |
| 4th SAMPLE | ACRYL GROUP DISPERSION | 10 | 380 | 7 | STRONG | −58 |
| 5th SAMPLE | ACRYL GROUP DISPERSION | 30 | 450 | 9 | WEAK | −28 |
| 6th SAMPLE | ACRYLONITRILE-BUTADIENE GROUP LATEX | 80 | 1500 | | | −25 |
| 7th SAMPLE | STYLRENE-BUTADIENE GROUP LATEX | 150 | 300 | | | 6.0 |

TABLE 2-continued

| 8th SAMPLE | AQUEOUS THERMOPLASTIC POLYESTER GROUP DISPERSION | | −20 |
| --- | --- | --- | --- |

Figure 10:
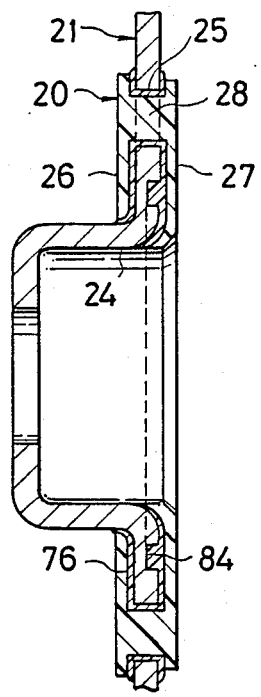
FIG. 10 is an enlarged, partially sectional view showing a second embodiment of the present invention.

FIG. 10 is the enlarged, partially sectional view showing the second embodiment of the present invention.

A difference of this embodiment from the first embodiment, resides in that an annular groove 84 is formed in the rear end face of the bracket 21 in a circular shape surrounding the window hole 24.

In this embodiment, when the dispersion of the copolymer of alkyl methacrylate-alkyl acrylate is coated on the bracket 21, the dispersion is accumulated in the annular groove 84, whereby the seal film 76 becomes thick in the portion of the annular groove 84, where the dispersion is accumulated. Accordingly, when the resin of the brush holder 20 is expanded or contracted in the radial direction, the seal film 7 thus thickened is pushed by the contact surfaces to the outer or inner peripheral surfaces of the annular groove 84, so that the sealing performance of the seal film 76 can be secured and further improved.

In Table 1, this second embodiment is indicated as a 9th sample, wherein the seal film is constructed similarly to a 2nd sample.

Figure 11:
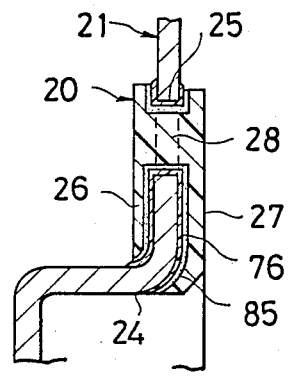
FIG. 11 is an enlarged, partially sectional view showing a third embodiment of the present invention.

FIG. 11 is the enlarged, partially sectional view showing the third embodiment of the present invention.

A difference of this embodiment from the first embodiment resides in that a layer 85 formed of a plastic impregnating agent, in addition to the seal film 76, is applied onto the contact surfaces between the bracket 21 and the brush holder 20. As the impregnating agent, one shown in Table 3 is used, and, as the impregnating method, the following method is used.

The bracket unit formed with the seal film is drawn a vacuum in a vacuum tank, thereafter, immersed in the liquid of the impregnating agent, further, drawn a vacuum again, and thereafter, impregnated under pressure.

The above-described impregnating agent or impregnating method is a mere example, and, as another impregnating agent, one such for example as water-glass may be listed.

In this embodiment, even if the seal film 76 is formed ununiformly, additional seal-up is obtainable by the impregnating layer 85, so that the sealing performance can be reliably maintained.

In Table 1, this third embodiment is indicated as a 10th sample, wherein the seal film is constructed similarly to the 2nd sample.

Figure 12:
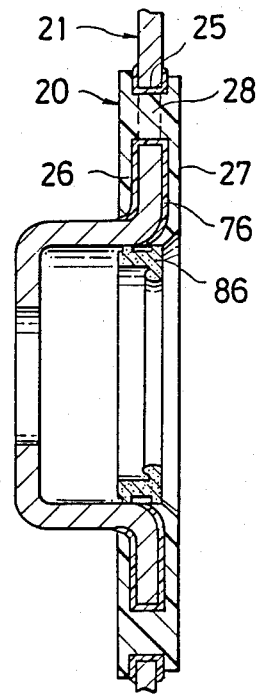
FIG. 12 is an enlarged, partially sectional view showing a fourth embodiment of the present invention.

FIG. 12 is the enlarged, partially sectional view showing the fourth embodiment of the present invention.

A difference of this embodiment from the first embodiment resides in that a rubber bushing 86 is fixed onto the inner periphery of the window hole 24 of the bracket unit 3 so as to seal up a boundary line between the bracket 21 and the brush holder 20.

In this embodiment, in addition to sealing by the seal film 76, the boundary line between the bracket 21 and the brush holder 20 on the inner periphery of the window hole 24, which causes the leakage, is sealed up by the rubber bushing 86, so that the sealing performance can be further improved.

In Table 1, this fourth embodiment is indicated as an 11th sample, and the seal film is constructed similarly to the 2nd sample.

Figure 13:
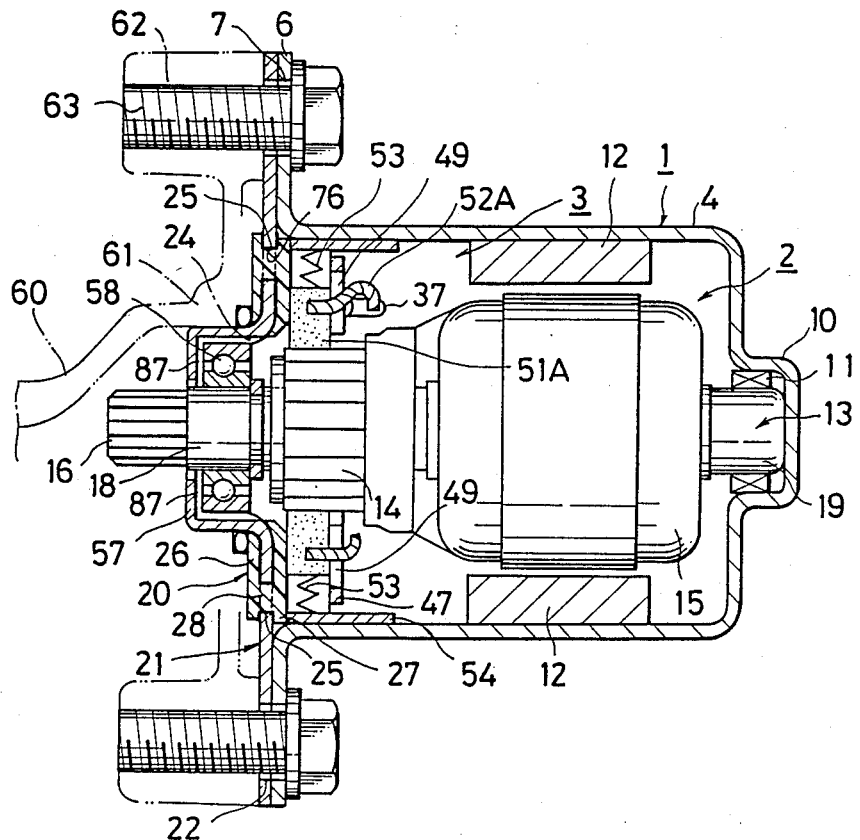
FIG. 13 is a longitudinal sectional view showing a fifth embodiment of the present invention.
Figure 14:
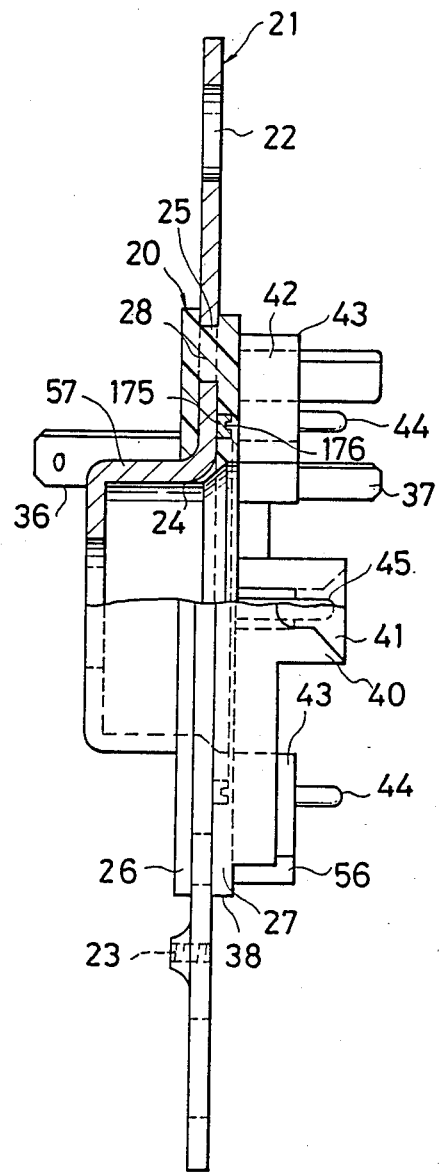
FIG. 14 is a partially cut-away, enlarged side view showing a bracket unit as being a sixth embodiment of the present invention.
Figure 15:
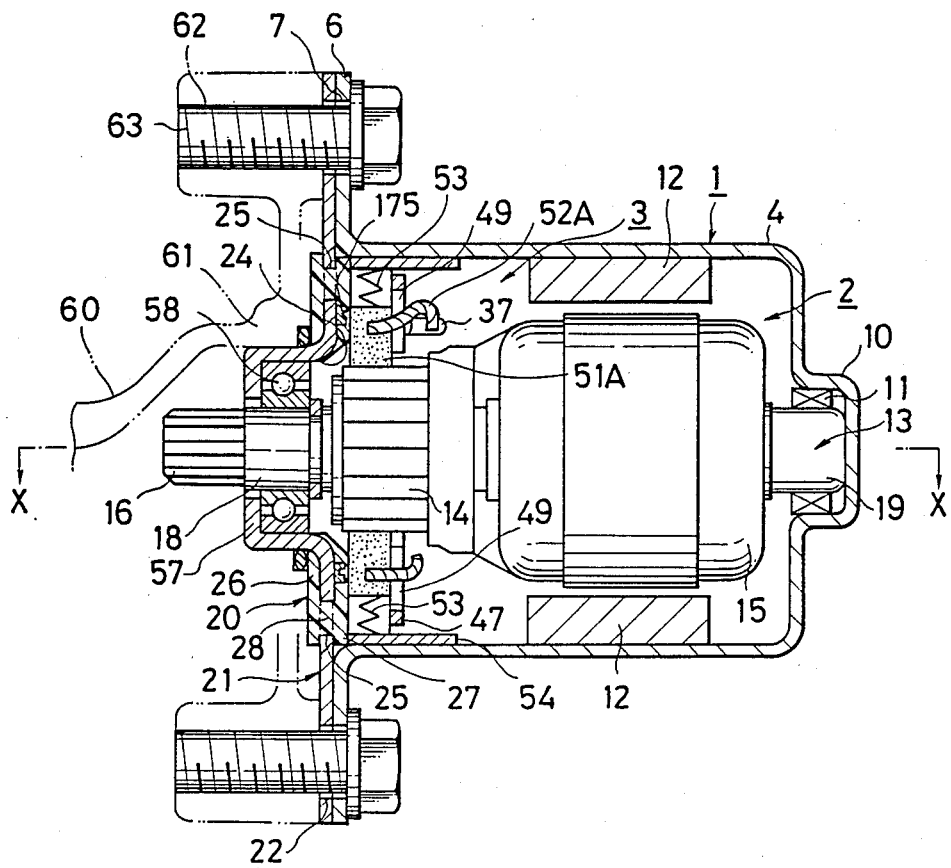
FIG. 15 is a longitudinal sectional view showing a starter motor in which the bracket unit of the sixth embodiment is used.
Figure 16:
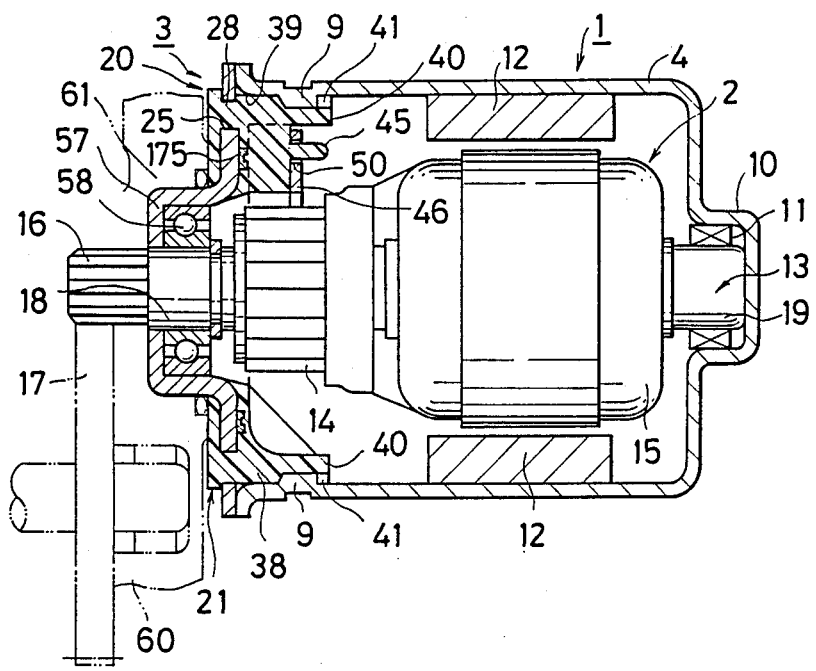
FIG. 16 is a sectional view taken along the line X—X in FIG. 15.
Figure 17:
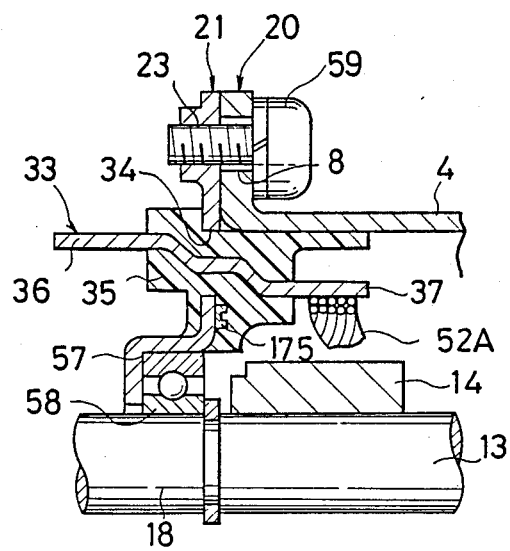
FIG. 17 is an enlarged, partially sectional view showing the terminal portion.
Figure 18:
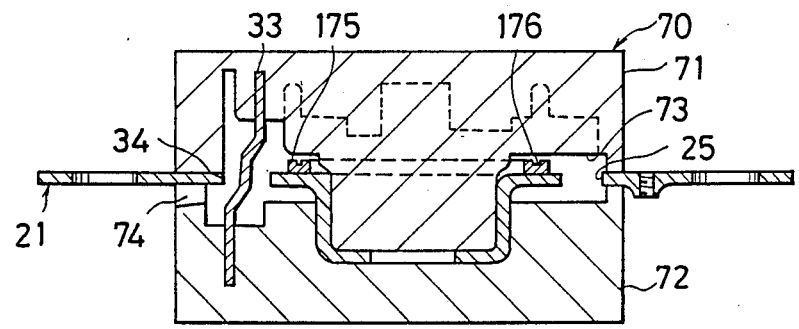
FIG. 18 is a longitudinal sectional view showing a partial manufacture thereof.

FIG. 13 is a longitudinal sectional view showing the fifth embodiment of the present invention.

A difference of this embodiment from the first embodiment resides in that an air passageway 87 is formed on the inner peripheral surface of the bearing member receiving portion 57 in the bracket 21 by sinkingly providing a portion of the inner peripheral surface in a direction of the axial line of the bracket 20, so that the interior and exterior of the bearing member 58 communicate with each other.

As described in the first embodiment, in the bracket unit 3 wherein the seal film 76 is interposed between the contact surfaces of the bracket 21 and the brush holder 20, the sealed state between the contact surfaces is reliably maintained, so that storm water, condensed water and the like can be prevented from intruding through the aforesaid portion from outside.

In this embodiment, the air passageway 87 is opened into the engine case 60, so that storm water, condensed water and the like are not allowed to intrude into the housing from the outside of the motor. Accordingly, the phenomenon of lowered motor performance due to the intrusion of water can be completely avoided. Further, the housing held air-tightly by the bracket unit 3 and the yoke 4 is communicated with the exterior through this passageway 87, so that changes in the internal pressure meeting the atmosphere, i.e. a so-called breathing action can be secured.

In the above-described embodiments 2 through 5, the seal film made of the resin or rubber having the high affinity to the metal and resin and the flexibility is interposed between the contact surfaces of the bracket and the brush holder, so that, even if the relation displacement occurs between the contact surfaces of the bracket and the brush holder, the sealed state can be maintained.

TABLE 3

| CONTENT | METHACRYLATE |
| --- | --- |
| SPECIFIC GRAVITY | 1.02 g/cc (25° C., HARVARD TYPE PYCNOMETER) |
| VISCOSITY | 9.5–11.5 cps (25° C., B-TYPE VISCOMETER No. 1 ROTOR) |
| pH (1%) | 6.0 (25° C., pH METER) |
| SURFACE TENSION | 33 dyne/cm (25° C., Du NOUY'S METHOD) |
| SHRINKAGE FACTOR | 7% (DILATOMETER) |
| SOLUBILITY | |
| WATER | SOLUBLE |
| ALCOHOL | EASILY SOLUBLE |
| CHLORIDE GROUP SOLVENT | EASILY SOLUBLE |

FIGS. 14 through 19 show the sixth embodiment of the present invention, and same reference numerals are used throughout the figures to designate the parts corresponding to those in the preceding embodiments.

In this sixth embodiment, before the bracket 21 is set in the molding tool 70, a seal member 175 made of rubber and formed into a circular ring shape is provided on and integrally baked to the one end face facing the yoke of the bracket 21, where the brush holder 20 is formed, in a manner to surround the window hole 24 at a position inwardly of the group of the small holes 25. This seal member 175 is formed in at least one portion thereof with an irregular portion 176 in the cross-section thereof.

As the rubber used for forming the seal member 175, there are listed butadiene group rubber (butadiene-styrene group rubber and chloroprene rubber (Neoprene, trademark of EI DUPONT DE NEMOURS & CO., INC.)), olefin group rubber (butyl rubber and isobutylene rubber), polysulfide synthetic rubber and cyclized rubber. As the rubber of the type described, there are used ones being bearable the molding temperature of resin (about 280° C.). Furthermore, as the method of baking the seal member 175 onto the bracket 21, there is such a method that the seal member 175 is urged against the outer surface of the bracket 21 being heated. In short, the baking method should use such a material that a portion of the seal member 175 is physically firmly connected to the outer surface of the metal of the bracket 21 and the material displays an outstanding anchoring effect so that the relative displacement may not occur between the seal member 175 and the bracket 21 after baking, and should adopt the baking method suitable for the above-described material.

Thereafter, this seal member 175 is inserted into the resin at the time of insert molding of the brush holder 20. More specifically, simultaneously with the insert molding of the brush holder 20, the seal member 175, which has been baked onto the rear surface of the bracket 21, is integrally buried in the rear wall portion 27 of the brush holder 20. In this case, the polyamide resin of the brush holder 20 pervades all over the irregular portion 176 of the seal member 175, to thereby form a uniformly contacted state.

In this embodiment, the seal member 175 made of rubber is interposed between the contact surfaces of the bracket 21 and the brush holder 20, so that, even after the thermal shock test performed, the motor housing can be maintained as expected. Accordingly, storm water, condensed water and the like can be prevented from intruding between the contact surfaces of the bracket 21 and the brush holder 20 into the motor housing from outside.

Figure 19:
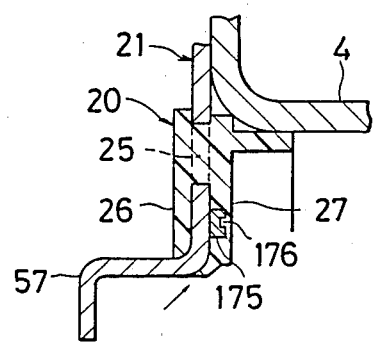
FIG. 19 is an enlarged, partially sectional view explaining the action.

More specifically, since the seal member 175 is baked onto the bracket 21, both members are integrally connected to each other by the anchoring effect to the outer surface of the metal. On the other hand, the seal member 175 is insert-molded in the brush holder 20, both members are integrally form-connected to each other in cooperation with the existence of the irregular portion 176, and, through the elastic force of the seal member 175, the seal member 175 is urged against the contact surface of the brush holder 20. Furthermore, the irregular portion 176 also performs a function of extending the leak path. Accordingly, during the thermal shock tests, even if the relative displacement occurs between the contact surfaces of the bracket 21 and the brush holder 20 due to the difference in the coefficient of thermal expansion between the metal and resin, the seal member 175 is bonded or adheres to both the bracket 21 and the brush holder 20 as shown in FIG. 19. Moreover, the seal member 175 made of rubber has the high flexibility, the seal member 175 is flexibly deformed to thereby allow the relative displacement between the bracket 21 and the brush holder 20 due to the difference in the coefficient of thermal expansion therebetween, maintaining unity of the seal member 175 itself. Accordingly, even if the relative displacement occurs between the contact surfaces of the bracket 21 and the brush holder 20 any space or air passageway therebetween is prevented by the seal member 175 from being formed, so that the motor housing can maintain the expected air-tightness even after the thermal shock tests as shown in FIG. 9 is performed.

Figure 20:
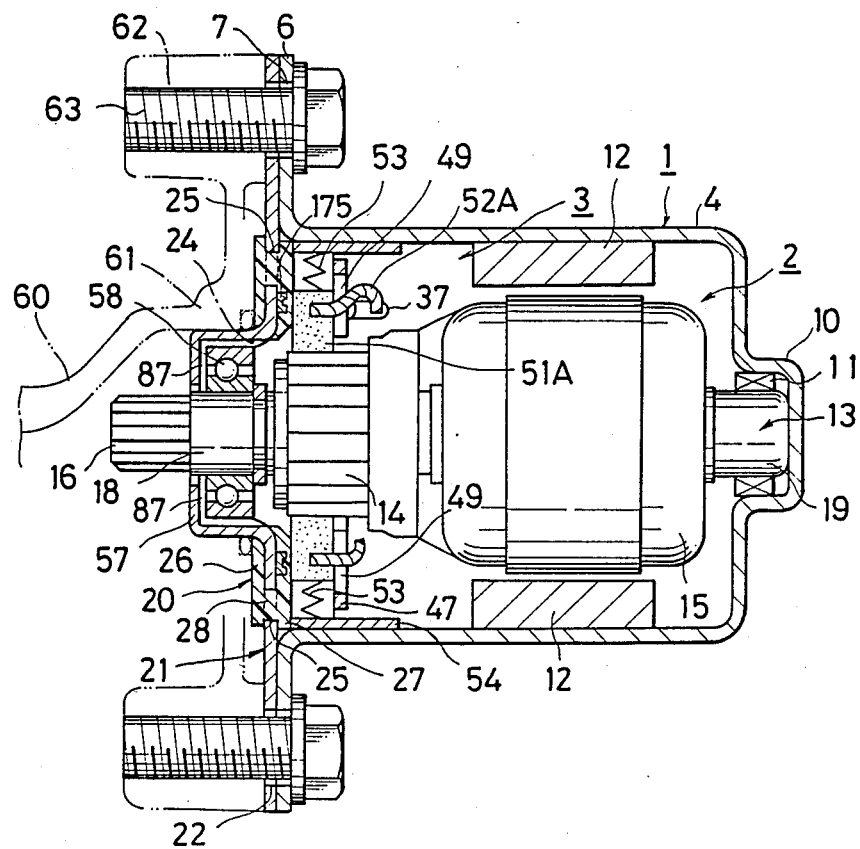
FIG. 20 is a longitudinal sectional view showing a seventh embodiment of the present invention.

FIG. 20 is the longitudinal sectional view showing the seventh embodiment of the present invention.

A difference of this embodiment from the sixth embodiment resides in that the air passageway 87 is formed on the inner peripheral surface of the bearing member receiving portion 57 in the bracket 20 by sinkingly providing the portion of the inner peripheral surface in the direction of the axial line of the bracket 20, so that the interior and exterior of the bearing member 58 are communicated with each other.

As described in the sixth embodiment, in the bracket unit 3 wherein the seal member 175 is interposed between the bracket 21 and the brush holder 20, the sealed state between the contact surfaces of the bracket 21 and the brush holder 20 is reliably held, so that storm water, condensed water and the like are prevented from intruding through the aforesaid portion from the outside of the motor housing.

In this embodiment, the air passageway 87 is opened into the engine case 60, so that storm water, condensed water and the like are prevented from intruding into the motor housing from the outside of the motor. Accordingly, the phenomenon of lowered motor performance due to intrusion of water can be completely avoided. The motor housing held air-tight by the bracket unit 3 and the yoke 4 is communicated with exterior through the air passageway 87, so that changes in the internal pressure meeting the atmosphere, i.e. the so-called breathing action can be secured.

In the sixth and seventh embodiments, the seal member made of rubber is baked onto the contact surfaces of the bracket and the brush holder and this seal member is insert-molded in the brush holder, so that, even if the relative displacement occurs between the contact surfaces of the bracket and the brush holder, the sealed state can be maintained.

Incidentally, the present invention need not necessarily be limited to the above embodiments, and, needless to say the present invention can be variously modified within the scope not departing from the gist of the invention.

For example, the bracket need not necessarily be limited to be formed of the Fe group material, and may be formed of any other metal material. The brush holder need not necessarily be formed of the polyamide resin, and may be formed of any other resin.

In the above embodiments, the case where the present invention is applied to the starter motor has been described, however, the present invention need not necessarily be limited to this, and may be applied to the revolving electric machines, such as any other motor and generator in general. Particularly, outstanding advantages can be achieved when the present invention is applied to the products requiring the liquid-tightness or air-tightness.

What is claimed is:

1. A composite unit including metal and resin, wherein a resin structure is integrally formed on a metal member, characterized in that a seal made of flexible resin or rubber having a high affinity to the metal and resin is interposed between contact surfaces of said metal member and said resin structure to maintain a sealed state between said metal member and said resin structure during predetermined relative displacements between the contact surfaces of said metal member and said resin structure.

2. The composite unit including metal and resin as set forth in claim 1, wherein said seal film is formed by use of a dispersion having as its main component a copolymer of alkyl methacrylate-alkyl acrylate.

3. The composite unit including metal and resin as set forth in claim 2, wherein said metal member is formed by use of an Fe group material and said resin structure by use of polyamide resin, respectively.

4. A composite unit including metal and resin, wherein a resin structure is integrally formed on a metal member, characterized in that said metal member penetrates said resin structure and a seal means made of a copolymer of alkyl methacrylate-alkyl acrylate or rubber having flexibility and high affinity to the metal and resin is interposed between contact surfaces of said metal member and said resin structure.

5. The composite unit including metal and resin as set forth in claim 1, wherein said metal member penetrates said resin structure.

6. A revolving electric machine wherein a brush holder is integrally formed on a bracket formed into a thin plate shape by use of resin and said bracket is attached to an opening of a yoke, characterized in that a flexible seal means made of rubber or resin having a high affinity to metal and resin is interposed between contact surfaces of said bracket and said brush holder to maintain a sealed state between said bracket and said brush holder during predetermined relative displacements between the contact surfaces of said bracket and said brush holder.

7. The revolving electric machine as set forth in claim 6, wherein an annular groove is formed in the contact surface of said bracket.

8. The revolving electric machine as set forth in claim 6, wherein said seal means is a seal film formed by use of a dispersion having an its main component a copolymer of alkyl methacrylate-alkyl acrylate.

9. The revolving electric machine as set forth in claim 8, wherein said bracket is formed by use of an Fe group material and said brush holder by use of polyamide resin, respectively.

10. The revolving electric machine as set forth in claim 6, wherein an annular groove is provided in the contact surface of said bracket, and said seal film is disposed in said annular groove.

11. The revolving electric machine as set forth in claim 6, wherein a later of a plastic impregnating agent is formed between the contact surfaces of said bracket and said brush holder.

12. The revolving electric machine as set forth in claim 6, wherein said bracket has an inner peripheral surface and a rubber bushing is fixed onto the inner peripheral surface of said bracket so as to seal up a boundary line between said contact surfaces.

13. The revolving electric machine as set forth in claim 6, wherein said bracket has an inner peripheral surface and opposite end faces and an air passageway is formed on the inner peripheral surface of said bracket so as to form communicating side spaces at said opposite end faces of said bracket (with each other).

14. The revolving electric machine as set forth in claim 6, wherein said seal means is a seal member made of rubber baked onto the contact surfaces between said bracket and said brush holder, and said seal member is insert-molded in said brush holder.

15. The revolving electric machine as set forth in claim 14, wherein said bracket has a window hole surrounded by through-holes, said seal member is provided at a position inwardly of the through-holes in said bracket and formed into an annular shape so as to surround the window hole in said bracket.

16. The revolving electric machine as set forth in claim 14, wherein said bracket has opposite end faces and an inner peripheral surface, said inner peripheral surface being provided with an air passageway in a manner to form communicating side spaces at said opposite end faces of said bracket.

* * * * *